May 15, 1962

C. A. V. SMITH 3,034,162

PORTABLE STRUCTURAL UNITS, PARTICULARLY BRIDGE UNITS

Filed Nov. 2, 1956

CHARLES AQUILA VINCENT SMITH

INVENTOR

BY *Bailey Stephens & Huttig*

ATTORNEYS

May 15, 1962  C. A. V. SMITH  3,034,162
PORTABLE STRUCTURAL UNITS, PARTICULARLY BRIDGE UNITS
Filed Nov. 2, 1956  16 Sheets-Sheet 2

CHARLES AQUILA VINCENT SMITH
INVENTOR
BY Bailey, Stephens & Huettig
ATTORNEYS

May 15, 1962 C. A. V. SMITH 3,034,162
PORTABLE STRUCTURAL UNITS, PARTICULARLY BRIDGE UNITS
Filed Nov. 2, 1956 16 Sheets-Sheet 3

CHARLES AQUILA VINCENT SMITH
INVENTOR
BY *Bailey, Stephens & Huettig*
ATTORNEYS

CHARLES AQUILA VINCENT SMITH
INVENTOR

May 15, 1962  C. A. V. SMITH  3,034,162
PORTABLE STRUCTURAL UNITS, PARTICULARLY BRIDGE UNITS
Filed Nov. 2, 1956  16 Sheets-Sheet 6

CHARLES AQUILA VINCENT SMITH
INVENTOR
BY *Bailey Stephens Huettig*
ATTORNEYS

May 15, 1962     C. A. V. SMITH     3,034,162
PORTABLE STRUCTURAL UNITS, PARTICULARLY BRIDGE UNITS
Filed Nov. 2, 1956     16 Sheets-Sheet 7

CHARLES AQUILA VINCENT SMITH
INVENTOR
BY Bailey Stephens Huttig
ATTORNEYS

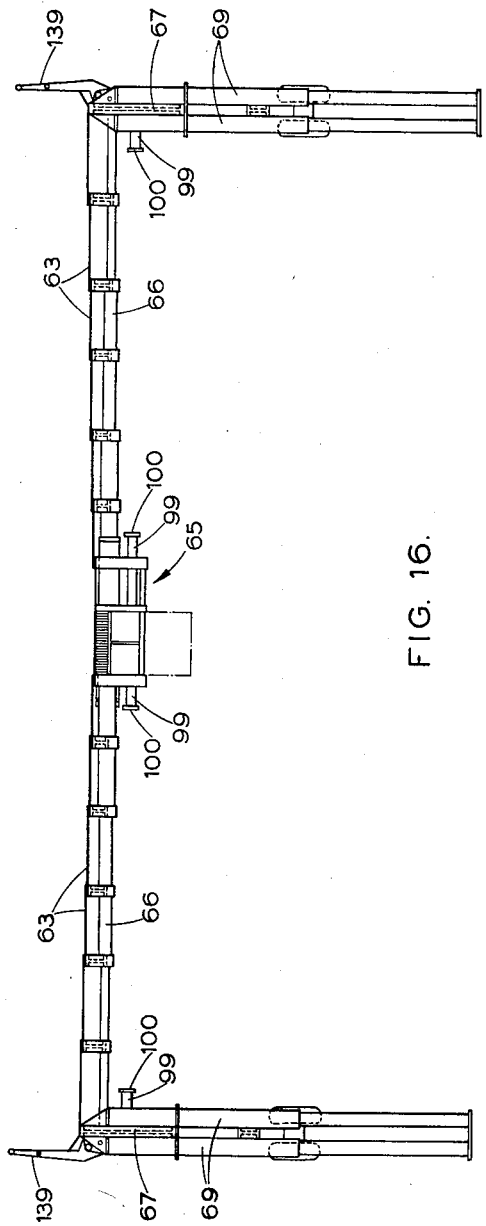

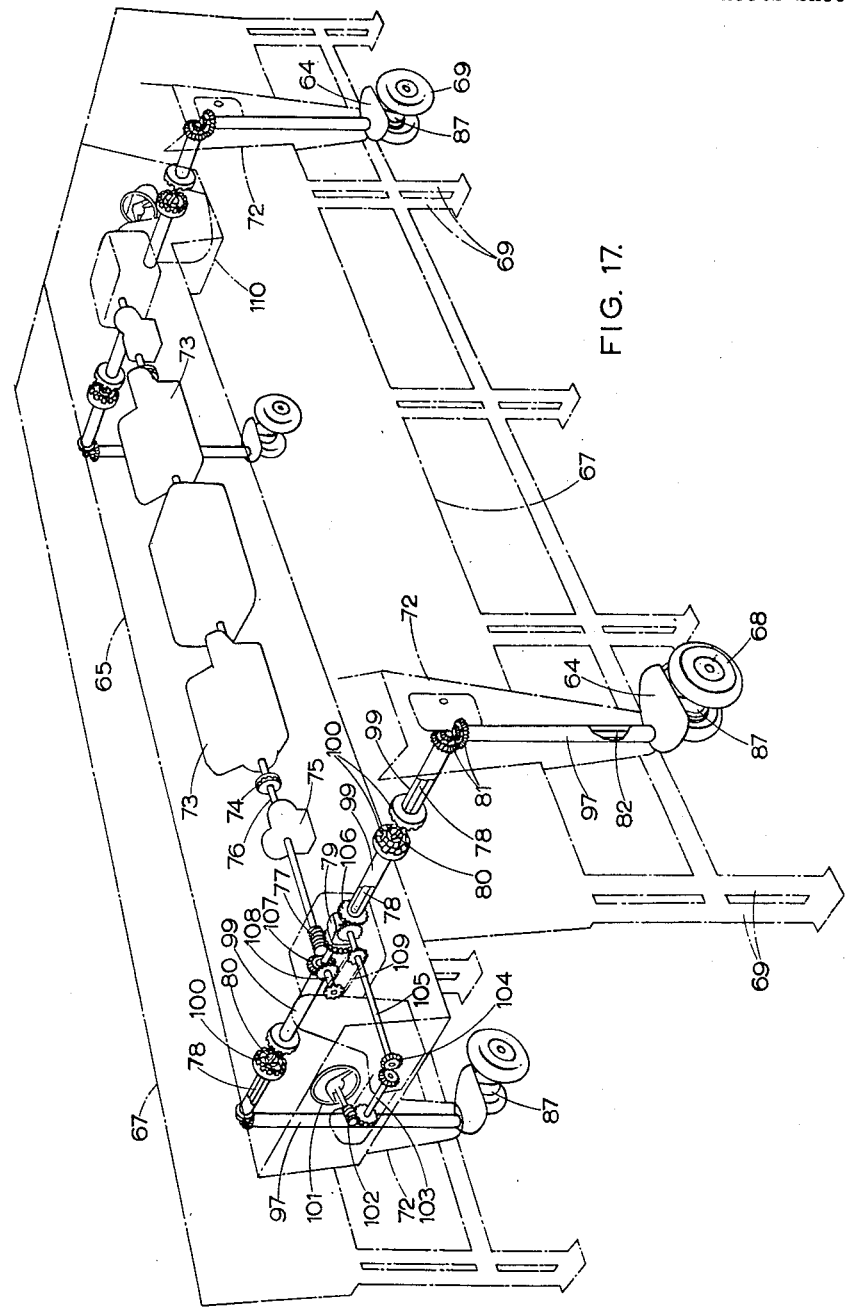

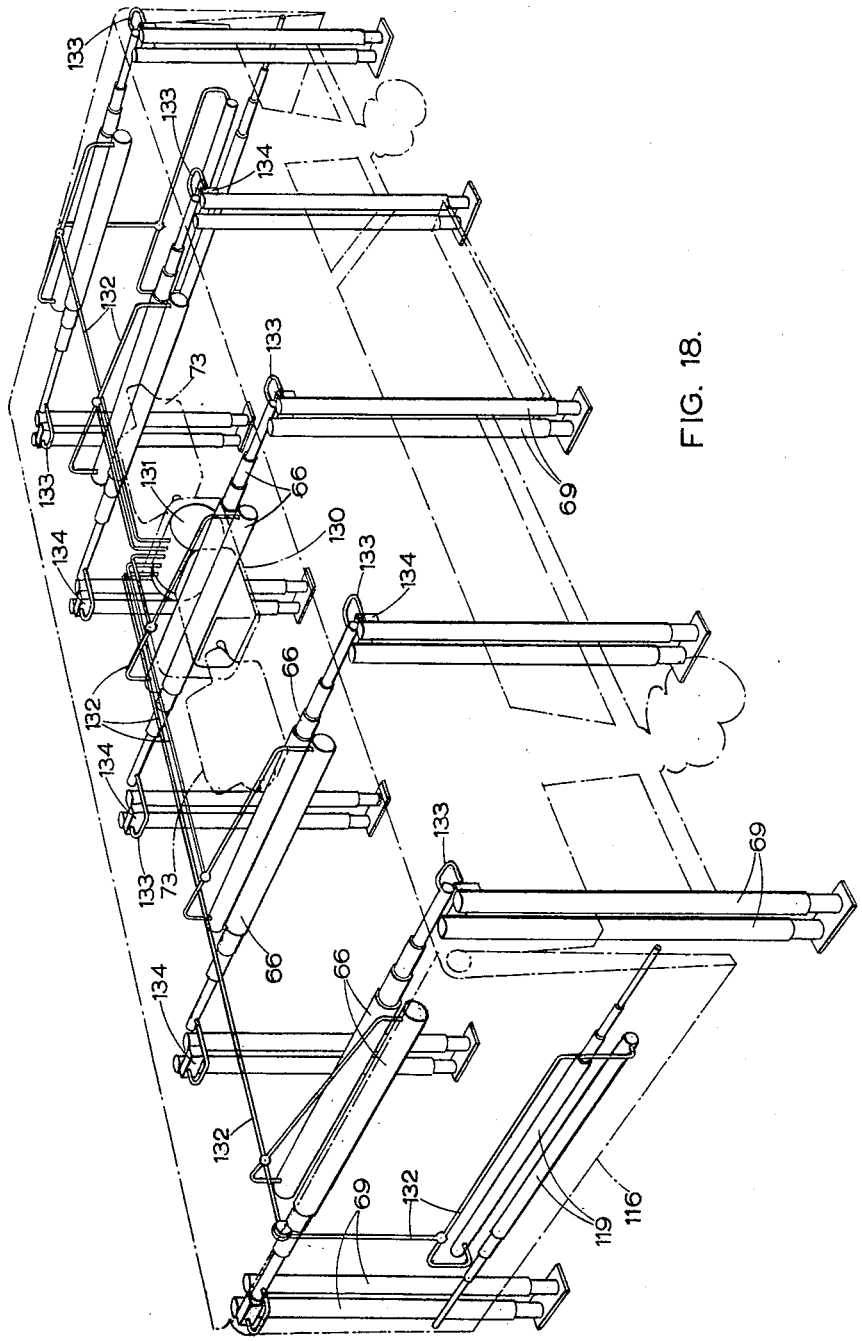

CHARLES AQUILA VINCENT SMITH
INVENTOR
BY Bailey Stephens & Huttig
ATTORNEYS

May 15, 1962     C. A. V. SMITH     3,034,162
PORTABLE STRUCTURAL UNITS, PARTICULARLY BRIDGE UNITS
Filed Nov. 2, 1956     16 Sheets-Sheet 12

CHARLES AQUILA VINCENT SMITH
INVENTOR
BY *Bailey Stephens & Huettig*
ATTORNEYS

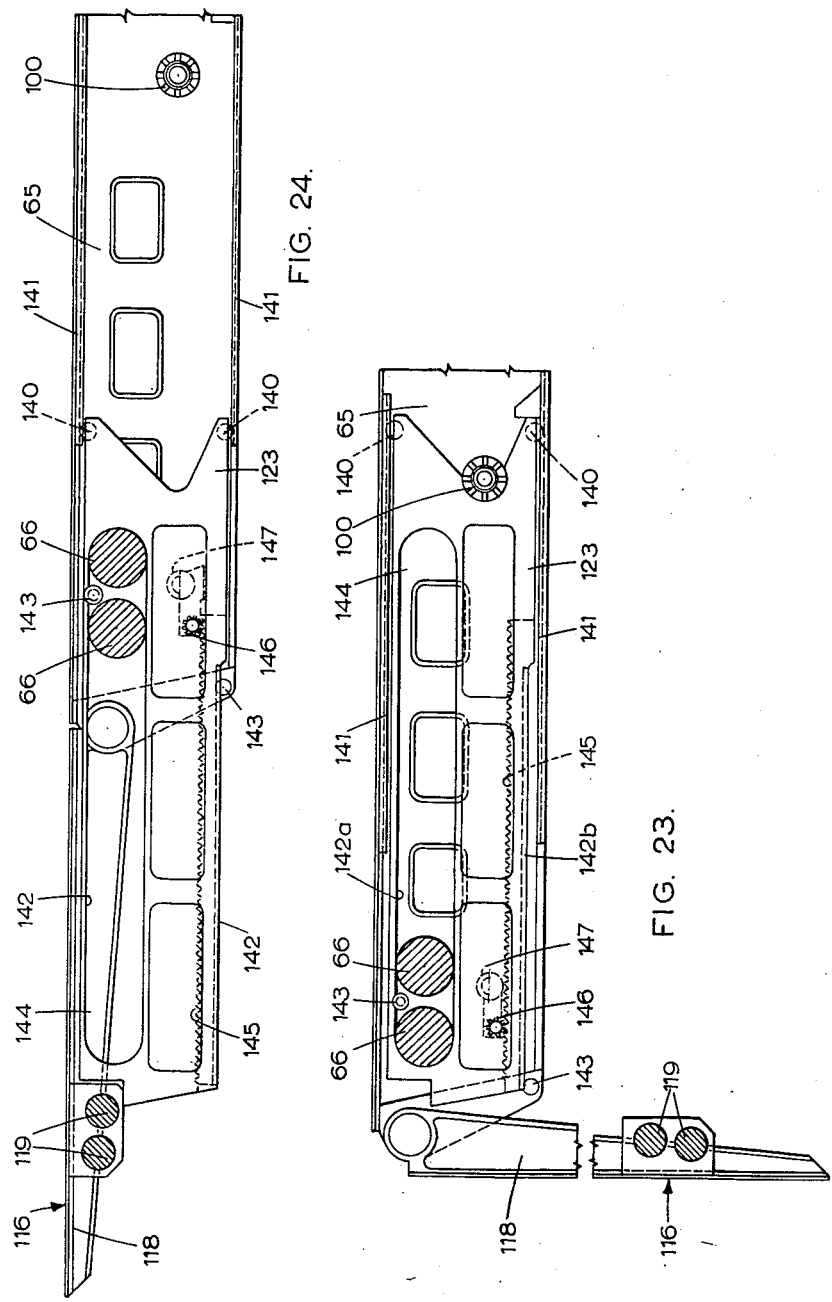

May 15, 1962 C. A. V. SMITH 3,034,162
PORTABLE STRUCTURAL UNITS, PARTICULARLY BRIDGE UNITS
Filed Nov. 2, 1956 16 Sheets-Sheet 15

CHARLES AQUILA VINCENT SMITH
INVENTOR

CHARLES AQUILA VINCENT SMITH
INVENTOR
BY Bradley Stephens & Luettig
ATTORNEYS

United States Patent Office
3,034,162
Patented May 15, 1962

3,034,162
PORTABLE STRUCTURAL UNITS, PARTICULARLY BRIDGE UNITS
Charles Aquila Vincent Smith, 50 Knightsbridge Court, Sloane St., London SW.1, England
Filed Nov. 2, 1956, Ser. No. 620,119
Claims priority, application Great Britain Nov. 7, 1955
12 Claims. (Cl. 14—72)

This invention relates to portable structural units, particularly bridge units such as may be used for elevated car parks.

According to the invention a transportable structural unit includes an extensible framework and a covering arranged to extend with the framework, the framework being capable of being held in its extended condition so as to provide a platform, floor, wall, roof or the like. The framework may comprise a central longitudinal girder or frame structure and extensible means carried by the structure for substantially increasing the superficial area of the structure on both sides but arranged to be folded comparatively closely to the structure for transportation or storage.

According also to the present invention a transportable bridge unit includes a framework comprising a central longitudinal girder or frame structure mounted for transportation, as on wheels, extensible means carried by the structure for substantially increasing the horizontal superficial area thereof on both sides, but arranged to be folded comparatively closely to the structure during transportation, and struts mounted on the extensible means for supporting the framework in its extended condition, as a bridge between the struts with an unimpeded passage beneath the assembly. In one arrangement, the extensible means comprise girders mounted to swing outwards substantially horizontally on each side of the frame structure, joists substantially parallel to the frame structure and having a sliding or translational connection with the outer ends of the girders so that the joists are separated from the frame structure by the outwardly swinging girders, and an extensible cover sheeting arranged to cover the extended framework. To provide adequate support for the cover sheeting within the extended frames, a sliding and rotational connection may be provided between each girder and at least one rib interposed between the frame structure and the joist associated with the girder, the arrangement being such that, as the girder is swung away from the frame structure, the rib separates from the joist and from the frame structure and provides an intermediate support for the cover sheeting. Moreover, intermediate chains of stringers may be interposed between the ribs and mounted beneath the cover sheeting, the chains of stringers being connected between the joists, and the stringers in each chain being arranged substantially to overlap one another when the joists are close together but to be drawn out into a long chain as the joists are separated.

The cover sheeting, which may comprise at least one sheet of a continuous opaque material such as the roller shutter material comprising a series of parallel laths secured to a flexible backing, may be arranged to be unrolled from rollers as the extensible means are extended. Alternatively the extensible cover sheeting may comprise overlapping metal sheets that are pulled out from under one another as the extensible means are extended.

Instead of employing hinged girders in the extensible means, as described above, the joists may be carried by telescopic beams arranged to be extended, on both sides of the frame structure, by hydraulic pressure for example.

The wheels or the like on which the frame structure is mounted for transportation may be mounted on legs attached directly to the frame structure and arranged to be retracted upwards into the framework when the latter is supported on the struts. Alternatively, in the case where the hinged girders are provided, the retractable legs may be mounted on the girders. In the latter event, the wheels are arranged to swivel to positions that will enable the girders to swing outwards as the structure is extended.

The bridge unit may be self-propelled, that is to say propelled by means of a motor mounted in the unit. Alternatively it may be towed to the position at which it is required and for that purpose certain or all of the wheels may be made castoring. On reaching the required location and after the structure has been extended, the struts are extended to lift the platform, provided by the extended and covered platform, to the required height. If the wheel legs are comparatively short, the platform may be lifted a substantial distance by the struts; for example, to such a height as to permit double-decker omnibuses to pass beneath. This is the case where the platform is intended to provide a car park or like platform above a street. Alternatively where the platform is intended, for example, to provide a platform over road-repairers, the elevation may be scarcely more than is required to raise the wheels slightly from the ground. In either event ramps that may be transported by the bridge unit are provided to enable vehicles to mount on to the platform and descend therefrom.

In order that the invention may be clearly understood, constructions in accordance therewith will now be described, by way of example, with reference to the accompanying diagrammatic drawings, in which:

FIGURE 4 is an end elevation of the unit of FIGURE 13;

FIGURE 16 is a view similar to FIGURE 15 but showing the unit opened out to its fullest extent;

FIGURES 17 and 18 are perspective views of certain mechanisms employed in the unit of FIGURES 13 to 16;

FIGURES 23 and 24 are sectional side elevations, on an enlarged scale, respectively showing yet a further part of the unit of FIGURES 13 to 18 in two different operative conditions;

It is to be understood that all the drawings are of a diagrammatic nature.

Figure 1:
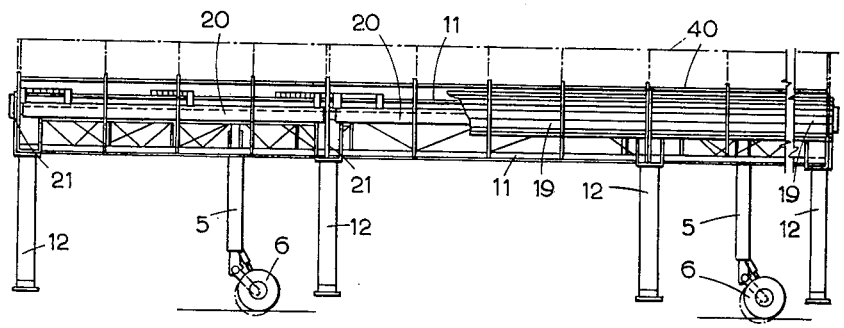
FIGURE 1 is a side elevation of a transportable bridge unit with certain parts shown broken away to disclose what is beneath, the unit being in a folded condition.
Figure 5:
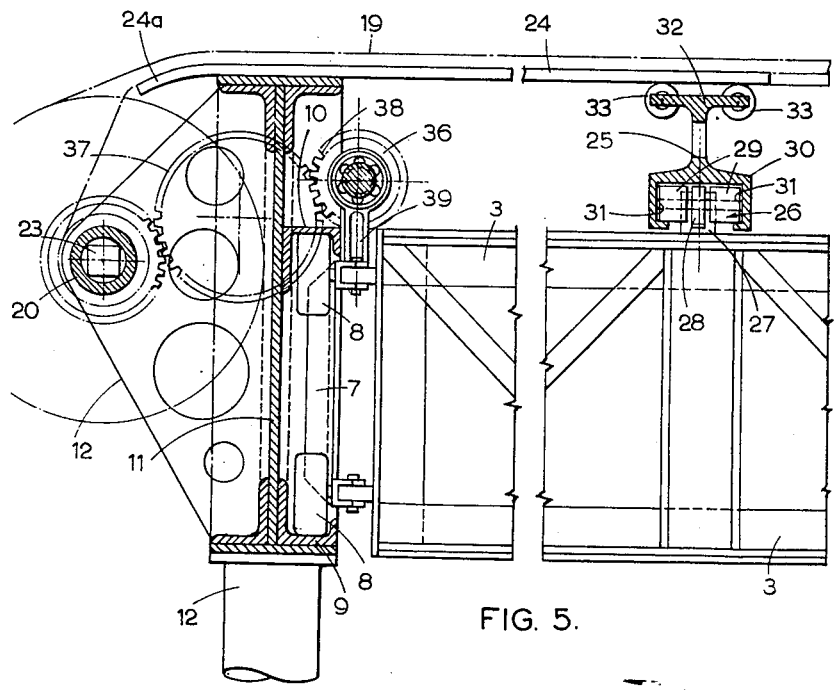
FIGURE 5 is a sectional end elevation, on an enlarged scale, showing certain details of the unit of FIGURES 1 to 4.
Figure 3:
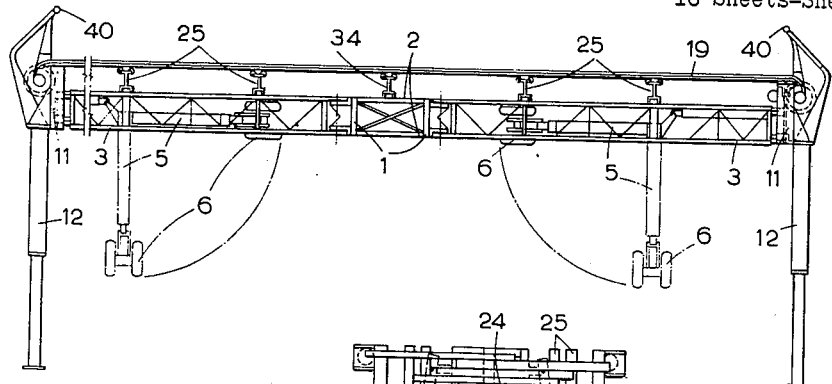
FIGURE 3 is an end elevation of the unit of FIGURES 1 and 2 when opened out to its fullest extent.
Figure 2:
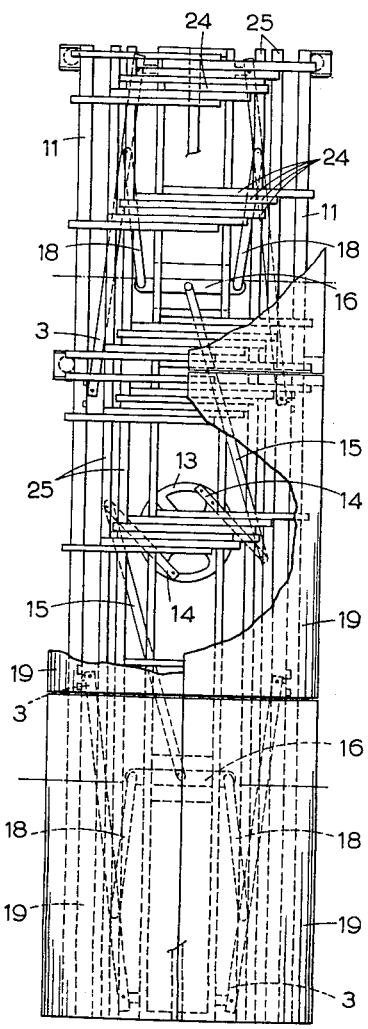
FIGURE 2 is a plan of the unit of FIGURE 1.
Figure 4:
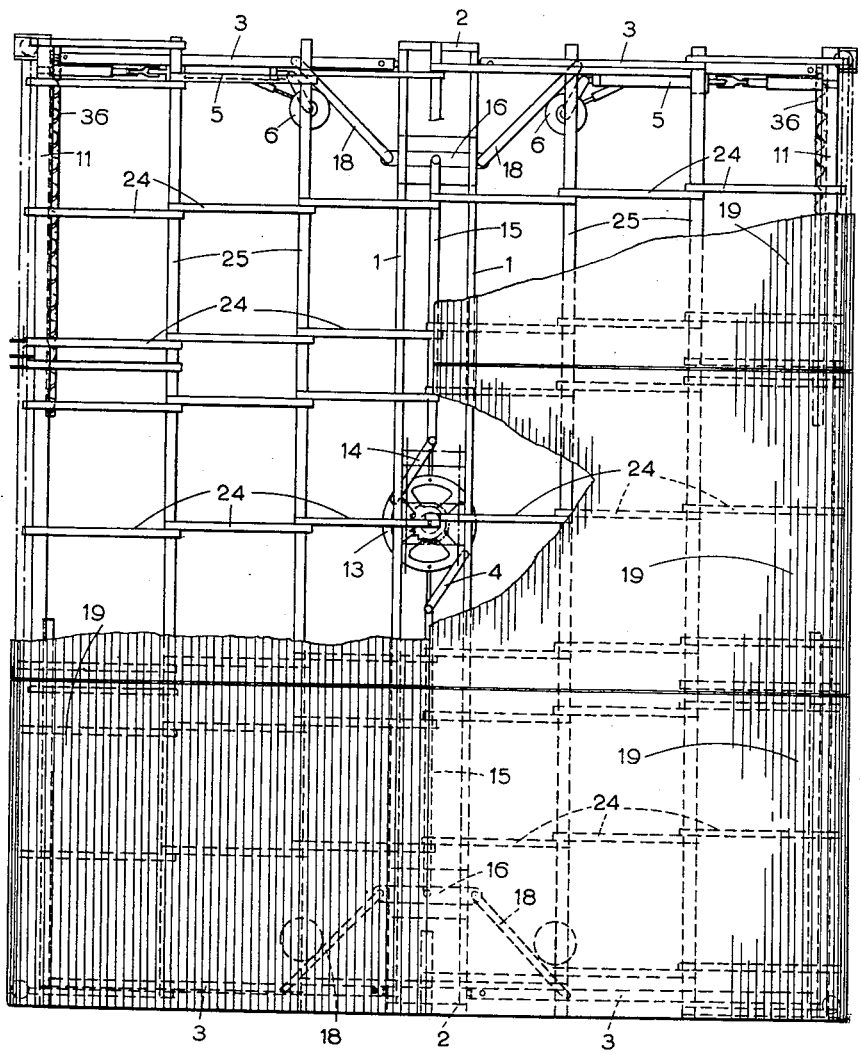
FIGURE 4 is a plan of the unit as shown in FIGURE 3.

The bridge unit shown in FIGURES 1 to 8 includes a central longitudinal rigid frame structure comprising built up girders 1 and cross-members 2. To the ends of the girders 1, near the ends of the frame and on each side thereof, are pivoted girders 3 which, in the condition of FIGURE 2 are folded inwards but which can be opened out at right angles to the frame 1, 2 as shown in FIGURE 4. Each of the four girders 3 carries an undercarriage leg 5 and each such leg may carry a pair of castoring wheels 6 on which the bridge unit may be wheeled (for example towed) to the required position. The legs 5 may be oil or air sprung as in an aircraft. Locks may be provided to prevent the wheels from castoring, for example in a side wind.

The end of each of the four girders 3 is pivoted about a vertical axis to a carriage 7 having four rollers 8 that run between rails constituted by a lower channel 9 and an inverted upper channel 10. There is, therefore a pair of channels 9, 10 on each side, each accommodating the two carriages 7 on that side, and each pair of channels is fixed to a longitudinal joist 11. Each joist 11 carries four telescopic struts 12 which, when contracted as shown in FIGURE 1, lie wholly above the surface such as a road, on which the wheels run, but which, as shown in FIGURE 3, can be expanded (for example, hydraulically) to lift the entire structure upwards, raising the wheels above the said surface.

In order to expand the structure from the condition of FIGURE 2 in which the joists 11 lie close to the frame 1, 2 to the condition of FIGURE 4 in which they are widely separated therefrom, a rotor 13 pivoted about a vertical axis to the frame 1, 2 is turned from the position of FIGURE 2 to that of FIGURE 4, by a motor (not shown) carried by the frame 1, 2. Rigid with the rotor 13 are arms 14 respectively connected by pivoted links 15 to slides 16 mounted to reciprocate in the frame 1, 2 simultaneously towards the rotor 13 in order to close the structure to the condition of FIGURE 2, and away from the rotor 13 in order to open it to the condition of FIGURE 4, opposite sides of each slide 16 being connected respectively by pivoted links 18 to the nearest girders 3.

During this expansion operation, the telescopic struts 12 are, of course, contracted and the castoring wheels 6 run on the road or other surface on which they rest. Simultaneously the rollers 8 run along the channels 9, 10 while their faces force the joists 11 apart.

Figure 6:
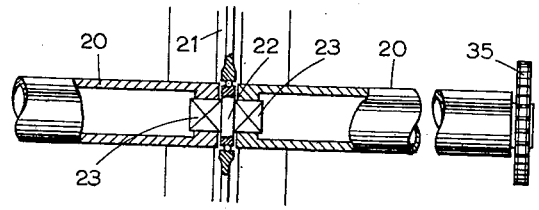
FIGURE 6 is a sectional side elevation of an assembly appearing in FIGURE 5.
Figures 7, 7A:
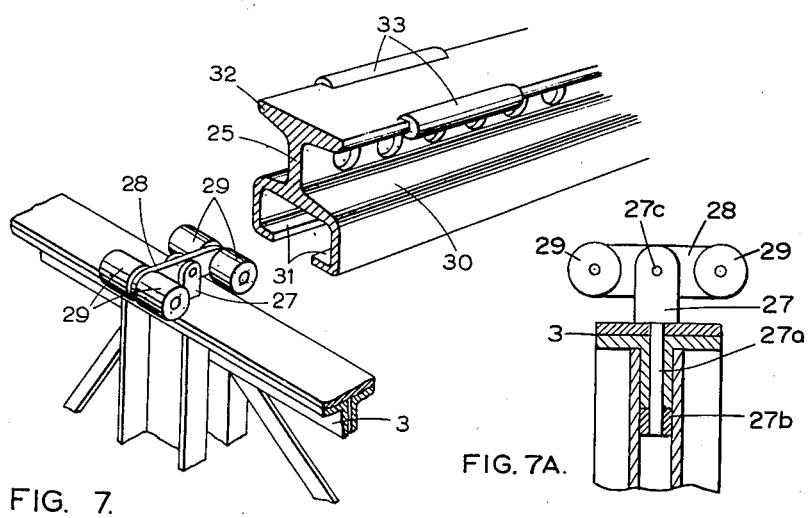
FIGURES 7 and 8 are perspective views of certain details appearing in FIGURE 5.
FIGURE 7a is a vertical section through the detail shown in FIGURE 7.
Figure 8:
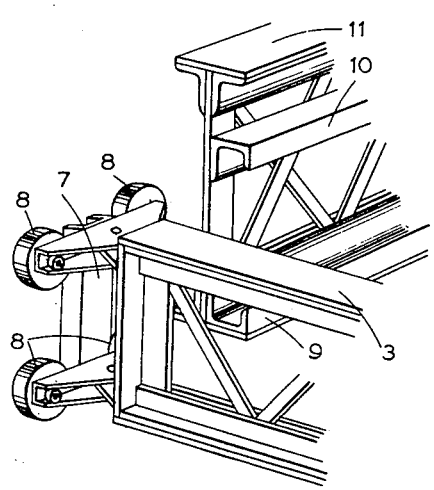

When the structure is fully expanded, the telescopic struts 12 can be extended as shown in FIGURE 3 and then the undercarriage legs 5 can be swung upwards from the chain line positions to the full line positions of FIGURE 3, by means of jacks 5a in order to leave a clear passage between the two rows of struts 12. The mechanism 5a for raising and lowering the legs 5 may be of any known type used for aircraft undercarriages. In order to provide a substantially continuous surface over this expanded bridge structure, flexible sheets 19 of the kind used for roller shutters and consisting of rigid parallel laths secured to a fabric or like flexible backing are arranged to unroll from rollers 20 as the structure is expanded. There are two rollers 20 respectively extending along the lengths of the joists 11. Each roller 20 is divided into three coaxial sections and is carried by four flanges 21, at the ends of the roller sections, fixed to the joists 11. As shown in FIGURE 6, adjacent ends of each pair of roller sections are connected to rotate as a unit by a member 22. Each of these members 22 is journalled in one of the flanges 21 and is formed with square projections 23 that fit into corresponding apertures in the ends of the roller sections.

There are six flexible sheets 19 allocated respectively to the roller sections and each such flexible sheet 19 is fixed at one end to its roller sections and at the other end to the equivalent end of the opposite sheet 19. Therefore, as the structure is expanded from the condition of FIGURE 2 to that of FIGURE 4, the flexible sheets 19 are pulled off the rollers 20 so as to provide the required continuous surface. In order to strengthen this surface between the rollers 20, a central rib 34 is mounted along the top of the centre frame 1, 2 and four further ribs 25 supporting stringers 24 between the rollers 20. The ribs 25 lie close to the central frame 1, 2 when the structure is contracted as shown in FIGURE 2 but become spaced apart as shown in FIGURE 4 as the structure is expanded. For this purpose a pair of roller assemblies 26 is pivotally mounted on the top of each girder 3. Each assembly 26 (FIGURE 7) comprises a fork 27, pivoted about a vertical axis, carrying a two-armed lever 28, pivoted about a horizontal axis 27c and furnished at each end with coaxial rollers 29 on opposite sides thereof. Each fork 27 is formed with a vertical pin 27a (FIGURE 7a) that is pivotally mounted in the associated girder 3. Upward movement of the pin 27a is prevented by a stop 27b fixed thereto. Each rib 25 has a bottom flange 30 formed with spaced longitudinal recesses 31 facing one another. The recesses 31 in each beam receive the rollers 29 of two assemblies 26 mounted respectively on two girders 3 and disposed with their vertical axes in a plane parallel to the joists 11. The arrangement is such that as the girders 3 are swung outwards to the positions of FIGURE 4, the assemblies 26 with their rollers 29 running along the recesses 31 carry the ribs 25 to the positions shown, and as the girders 3 are swung back to the positions of FIGURE 2 the assemblies 26 return the ribs 25 to their initial positions.

Each rib 34, 25 has a top flange 32 along the outer edges of which are distributed rollers 33 over which the stringers 24 run during the opening and closing of the structure. The stringers 24 are arranged in chains of six with pin and slot connections between them so that each chain can either be packed as shown in FIGURE 2, with adjacent stringers substantially overlapping one another, or drawn out as shown in FIGURE 4 with adjacent stringers only slightly overlapping one another. The outermost stringers in each chain are fixed respectively to the joists 11 so that, as the latter is expanded, the chain of stringers is lengthened. The outer end 24a of each outermost stringer 24 is curved downwards (FIGURE 5) over the outside of the associated joist 11 so as to lead the flexible sheet 19 smoothly thereover.

In order to cause the flexible sheets 19 to roll up when the structure is folded, the end of each roller 20 is furnished with a pinion 35 which drives a roller 36 on the associated joist 11 by means of gearing 37, 38. Each roller 36 is formed with a coarse peripheral helical groove (FIGURE 4) into which projects a pin 39 on the adjacent girder 3. Thus, as the girders 3 fold inwards to the central frame 1, 2, the pin 39 travelling along the length of the roller 36, causes the latter to rotate thereby rotating the associated roller 20 through the intervening gearing 38, 37, 35 and rolling up the associated flexible sheets 19.

In order to enable vehicles to climb up on top of the extended bridge unit and to descend again when required, ramps (not shown) are provided. These ramps are mounted at the ends of the bridge unit and are considerably narrower than the extended unit. They may be carried on top of the contracted unit during transit of the latter from one point to another. Rails, such as folding side rails 40 carried by the joists 11, are provided to prevent people or vehicles from falling over the edges of the structure.

Figure 9:
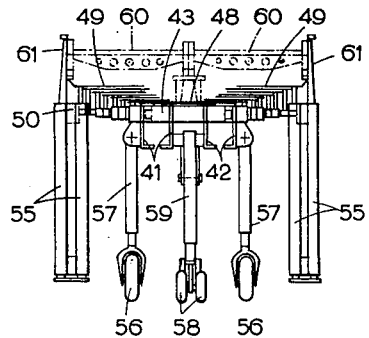
FIGURE 9 is an end elevation of another transportable bridge unit, the unit being shown in a folded condition.
Figure 10:
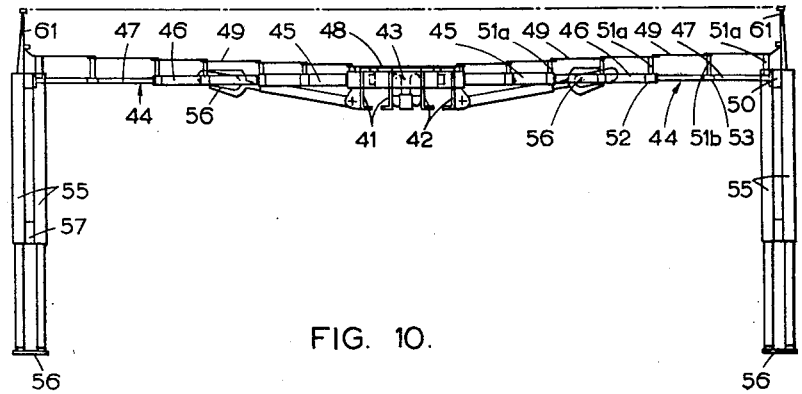
FIGURE 10 is an end elevation showing the unit of FIGURE 9 in its fully extended condition.
Figure 11:
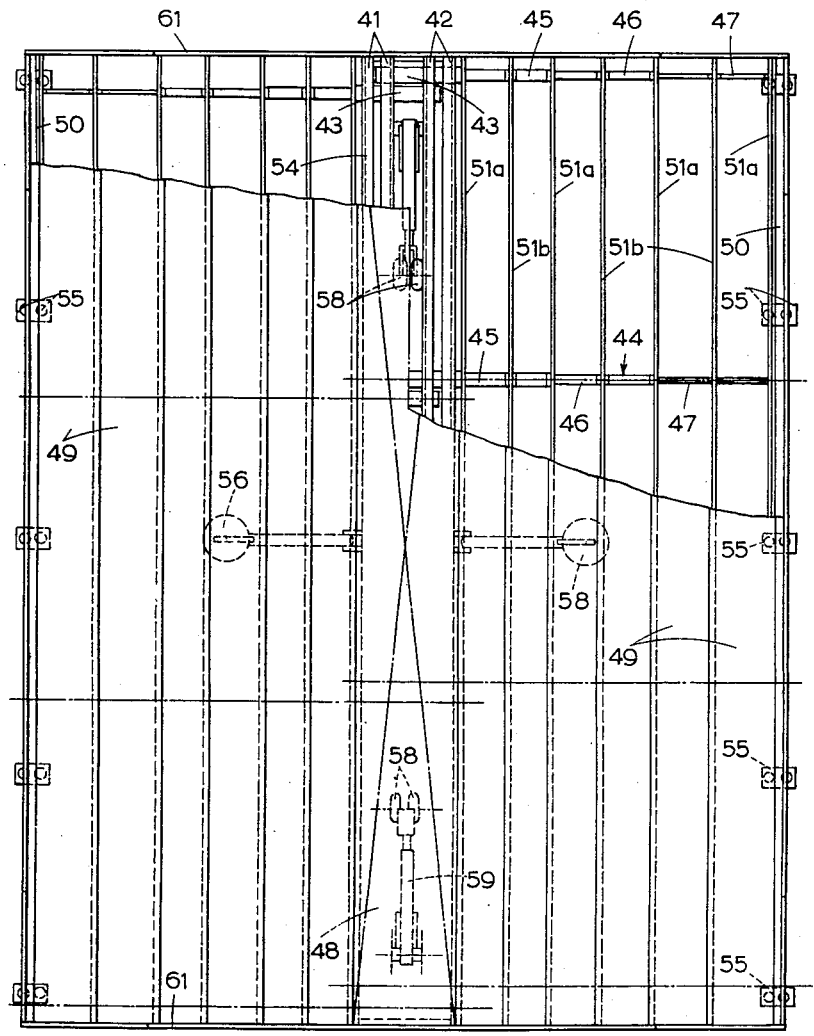
FIGURE 11 is a plan of the unit shown in FIGURE 10.

Referring now to the transportable bridge unit of FIGURES 9 to 12, it will be seen that this includes a central longitudinal frame structure comprising two pairs of joists 41, 42 fixed together by transverse tubular members 43 constituting the inner ends of telescopic beams 44 arranged to extend outwards horizontally on opposite sides of the frame structure 41, 42, when subjected to internal fluid pressure, from the condition of FIGURE 9 to that of FIGURES 10 and 11. In practice the beams 44 on each side may be more closely spaced than appears in FIGURE 11.

In addition to the tubular member 43, each beam 44 comprises three tubular sections 45, 46, 47 slidable one within the other. The outermost end of each tubular section 47 is closed and the remote end of each tubular member 43 is also closed. Each of the sections 45, 46, 47 opens into the next larger section into which it fits, so that fluid under pressure admitted to the interior of each beam 44, when the latter is contracted, as shown in FIGURE 9, causes the beam to expand to the condition of FIGURES 10 and 11. The outward movement of the sections 45, 46, 47 may be limited by any convenient means. The fluid may be supplied under pressure by a motor driven pump mounted in the frame structure 41, 42. To cause the beams 44 to contract the action of the pump may be reversed so as to suck the fluid out of the beams 44. The outer ends of the tubular sections 47 are fixed to a joist 50, on each side, parallel to the joists 41, 42.

Figure 12:
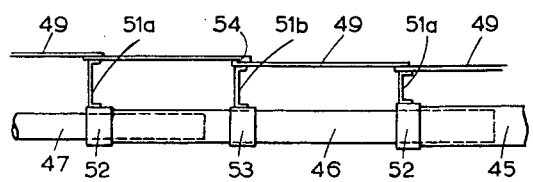
FIGURE 12 is a fragmentary view of a detail, shown on an enlarged scale, of the unit of FIGURES 9 to 11.

The necessary platform surfaces over the central frame structure 41, 42 and over the beams 44 is constituted by a longitudinal plate 48 fixed over the top of the frame 41, 42 and two series of overlapping plates 49 on opposite sides of the frame 41, 42. Each plate 49 along its outer edge is fixed to a stringer 51a or 51b, the stringers 51a being fixed to collars 52 which, in turn, are fixed to the ends of the tubular sections 45, 46, 47, and the stringers 51b being fixed to collars 53 slidable along the outsides of the tubular sections 45, 46, 47. When the beams 44 are in their contracted condition the collars 52, 53 and the stringers 51a, 51b are packed together as shown in FIGURE 9. When, however, the beams 44 are expanded, the collars 52 and stringers 51a, fixed to the sections 45, 46, 47, separate from one another and the plates 49 fixed to these stringers 51a slide over the plates 49 fixed to the stringers 51b until ribs 54 (FIGURE 12) on these overlapping pairs of plates engage one another, whereupon the collars 53 are caused to slide along their respective sections 45, 46, 47 until the stringers 51a, 51b are substantially equidistantly spaced with the plates 49 overlapping one another as shown in FIGURES 10 to 12. In the return movement, the stringers 51a approach one another, and the sliding collars 53 with the stringers 51b slide along their sections 45, 46, 47. After engaging the ends of the members 43, or sections 45, 46 into which these sections slide, the parts once more becoming packed together as shown in FIGURE 9.

Fixed to each of the outer joists 50 is a series of five pairs of telescopic struts 55, the ram portions of each pair being joined together at their lower ends by a horizontal plate 56a and the cylinder portions of each pair being joined together by webs 57.

When the unit is being towed to a site, the rams 55 are retained in the contracted condition of FIGURE 9 and the unit runs on an undercarriage comprising a pair of lateral wheels 56 with their common axis athwart and below the centre of the central frame structure 41, 42, and fore and aft wheels 58. The wheels 56 are mounted respectively on legs 57. Tilting of the unit about the axis of the wheels 56 is prevented by the wheels 58, which are arranged as pairs of castoring wheels mounted at the ends of central fore and aft legs 59.

Ramps 60 are carried in dismountable supports on the top of the unit as shown in FIGURE 9. These ramps are of substantially the same length as the frame structure 41, 42.

On reaching the position at which the unit is required for use, the beams 44 are extended and then the struts 55 are caused to extend so as to lift the wheels 56, 58 from the ground. The undercarriage is then retracted by swinging the legs 57 outwards to the positions of FIGURES 10 and 11 and by swinging the legs 59 upwards and towards one another so as to lie between the pairs of joists 41, 42.

The ramps which are curved at their ends so as to lead gently on to the platform and on to the ground, when mounted in their operative positions, may be levelled and supported along their lengths by telescopic struts or jacks. The ramps may be mounted so as to communicate with the sides of the platform or with the ends of the platform. Rails 61 are detachably secured, as required, about the platform.

It will be appreciated that the extensible frameworks with their flexible or overlapping plate coverings, described above with reference to the drawings may be used as portable permanent or temporary floors, roofs or the like in building construction, the units in that event, of course, not being provided with the undercarriages and struts unless such items can be made use of in the erection of the buildings.

It is to be understood that the ramps need not be carried on top of the extensible framework but they may be mounted, for example, beneath this framework. In the latter event the wheels may be attached to the ramp so that, when the struts have been extended to support the framework, each ramp, or in the event of there being only one ramp, the ramp can be wheeled outwards to the required position. The ramp is then adjusted to the required inclined position. Alternatively the ramps may be projected outwards by means of telescopic beams like the beams 44.

It is advantageous to provide at least one staircase leading from the ground up to the platform. In the construction of FIGURES 1 to 8, such a staircase may be hinged to one end of one of the joists 11 and a similar staircase hinged to the opposite end of the other joist 11, each staircase being arranged to fold upwards to a position parallel to its respective joist, and, after the extension of the framework, lowered to its inclined and operative position. Similar staircases may be applied to the joists 50 in the construction of FIGURES 9 to 12.

Certain of the side rails 40, 61 may be replaced by flower boxes or small shop showcases. At essential points on the periphery of the structure, where vehicles or people are to enter or leave the platform, detachable or folding rails are retained.

Where a platform of increased area is required, two or more of the bridge units may be joined end to end or side by side. Where gaps are left between the units, further to increase the area or to provide space for an obstacle such as a lamp post, the units are joined by subsidiary platforms mounted on the units and bridging the gaps.

It has been suggested above that the extensible platform may constitute a floor, wall, roof or the like. It may be added that the transportable units comprising the extensible framework supported by lateral struts as described above, may themselves serve as buildings such as houses or factories, in which case the covering over the framework is arranged to constitute a roofing, and wall panels are mounted on the struts. This panelling is furnished with windows and doors as required and comprises overlapping portions that enable the panelling to extend when the struts and framework are extended. The roof may be made to slope downwards from the central longitudinal girder or frame structure. Flooring may be provided by an extensible framework and covering similar to that used for the roof and connected between the rows of struts on each side. The wheels in this case may be at the lower ends of the struts and need not be arranged to fold out of the way.

Where the unit of FIGURES 9 to 12 or, alternatively that described below with reference to FIGURES 13 to 29, is to be made as narrow as possible in the folded condition, it is advantageous to make the number of sections in each telescopic beam 44 as large as possible and to make the plates 49 correspondingly numerous and narrow. Alternatively the form of construction shown in FIGURES 1 to 9 may be used but with overlapping plates, like the plates 49, the pivoted girders 3 having series of spigots or rollers on top that slide in grooves on the undersides of the plates. These grooves, which may be parallel to the longer edges of the plates, are so acted upon by the spigots or rollers, as the girders 3 are opened out at right angles to the frame 1, as to cause the packs of plates to spread out while the plates still overlap one another.

Referring to the transportable bridge unit of FIGURES 13 to 29, it will be seen that this has certain features in common with that of FIGURES 9 to 12 in that there is a central longitudinal frame structure 65 and telescopic beams 66 arranged to extend outwards on opposite sides of the frame structure 65. Again, in practice, these telescopic beams 66 may be more numerous and consequently spaced more closely together than appears in the drawings. The outer ends of the telescopic beams 66 are hinged to deep-joists 67 located on opposite sides of the frame structure 65 and parallel thereto. Also as in the construction of FIGURES 9 to 12, the joists 67, on being separated so as to move from the position of FIGURE 15 to that of FIGURE 16, cause a platform surface of overlapping plates 63 to be extended, and, as in that construction, the joists 67 carry pairs of telescopic struts 69 which are extended, after the unit has been opened out, to provide support therefor. The upper portions of these struts 69 are braced together by beams 70 and to the joists 67 by beams 71. One of the beams 70 is omitted from FIGURE 13 to reveal other details. The unit is about sixty feet long and fifteen feet, six inches wide before being opened out. After being opened out it is about forty-nine feet wide. It is ten feet, nine inches high before the struts are extended and seventeen feet, nine inches high after the struts are extended, this measurement being from the bottoms of the struts to the surface of the platform.

The main difference between the construction of FIGURES 13 to 29 and that of FIGURES 9 to 12 is that the former is self-propelled. Moreover, the legs 72 of the wheeled undercarriage are not retractable but are lattice structures rigidly fixed to the joists 67. Pairs of co-axial wheels 68 are mounted on arms 64 that extend radially respectively from the lower ends of the legs 72. In the construction shown in the drawings all eight wheels are shown as being driven but it will be appreciated that this is not an essential feature of this particular construction, and that a practical arrangement can be made in which only the wheels at one end are driven.

As shown in FIGURE 17, two coupled internal combustion engines 73 are mounted in the central frame structure 65. The left-hand pairs of twin wheels 68 are driven by these engines through a clutch 74, a gear box 75, a shaft 76 and worm gearing 77 that drives transverse shafts 78 on opposite sides through a differential gear 79. Each shaft 78 is divided into two parts that are coupled by clutch elements 80 when the bridge unit is in the contracted condition of FIGURES 14 and 15 but which separate from one another when the unit is expanded. The transverse shafts 78 drive, through bevel gearing 81, vertical shafts 82, in the left-hand legs 72. The lower end of each vertical shaft 82 drives, through bevel gearing 83 (FIGURE 20), a horizontal shaft 84 mounted in the associated one of the arms 64. The remote end of each such shaft 84, through bevel gearing 85, drives the associated pair of wheels 68, through a vertical shaft 86 and differential gearing in a casing 87. The shaft 86 comprises two telescoping parts, splined to one another, so that the shaft 86 can contract and extend as the wheels rise and fall, relatively to the arm 64, under the action of helical springs in telescopic casings 88 (FIGURE 19) pivotally connected between two arms 89 and the casing 87.

The unit is steered by turning each forward pair of wheels 68 about a vertical axis bisecting the axis of the two wheels. Thus, each differential casing 87 has fixed thereto a vertical tube 90 (FIGURES 19 and 20) which is splined within a collar 91 from which the two arms 89 extend in opposite directions. The collar 91 bears against the associated arm 64, with interposed roller thrust bearings, and has fixed thereto a co-axial tube 92 journalled in the arm 89. The tube 92 is provided at its upper end with a bevel gear 93 through which the assembly comprising the wheels 68, the differential casing 84, the spring casings 88 and the tubes 90, 92 are turned about the aforesaid vertical axis for steering. The vertical shaft 86 passes concentrically through the tubes 90, 92.

Each steering bevel wheel 93 meshes with a bevel wheel 94 on a tube 95 journalled in the associated arm 64 and connected at its opposite end through bevel gearing 96 with a vertical tube 97 in the undercarriage leg 72. The upper end of each vertical tube 97 is connected by bevel gearing 98 to a horizontal tube 99. It will be seen that the shafts 78, 82, 84 are respectively concentric with the tubes 99, 97, 95 and that each horizontal tube 99 is divided, like the shaft 78, into two parts that are coupled by clutch elements 100 when the bridge unit is in the contracted condition but are separated from one another when the unit is expanded. A steering wheel 101 is connected by worm gearing 102, a shaft 103, bevel gearing 104, a shaft 105 and bevel gearing 106 to one of the divided tubes 99, the other being connected through bevel gearing 107, a shaft 108 and a sprocket and chain connection 109 to the shaft 105.

The right-hand pairs of wheels, as shown in FIGURE 17, are driven in precisely the same way as the wheels at the left-hand end of that figure, except that a reversing coupling is inserted to ensure that all the wheels turn in the same direction. Also at the right-hand end a steering system, precisely the same as that at the left-hand end, is provided. This enables the unit to be driven from either end. A gondola 110 is provided at each end of the frame structure 65 for the driver. Each such gondola comprises a base 117, a driver's seat 112 and a pillar for the steering wheel 101 and, when in use, the gondola is lowered to the position of FIGURE 21 so as to provide enough room for the driver. When, however, the bridge unit is in use as a bridge, each gondola is swung upwards on pairs of links 113, 114 by a jack 115 to the position of FIGURE 22 to provide sufficient clearance beneath the frame structure 65. To enable this movement to take place, the shaft 105 is made in two parts that can be disconnected from one another. However, it is desirable to provide means for locking the part of the shaft that remains mechanically connected to the associated wheels 68. This prevents each pair of wheels from swivelling in an undesirable fashion about the axis of the tubes 90, 92, when the unit is being steered from the other end. The differential gears permit the necessary relative rotation between the wheels at both ends.

In order to increase the superficial area of the extended platform, flaps 116 are hinged at opposite ends of the unit. These flaps comprise end ribs 117 hinged respectively to the joists 67 and a centre portion 118 hinged to the frame structure 65, this centre portion being partially transparent or open so as to provide a view forward for the driver in the adjacent gondola, when the flap is lowered. The end ribs are joined by a pair of telescopic beams 119 (FIGURE 18) that are operated simultaneously with the telescopic beams 66 so as to cause the flap to expand simultaneously with the deck of the unit. Overlapping plates, similar to the plates 63, occupying the areas 120 in FIGURE 14, furnish the necessary platform surfaces between the ribs 117 and the centre portion 118. The means for raising the flaps comprise members 121 arranged to slide horizontally on the joists 67 under the action of hydraulic rams or other convenient means, the members 121 being connected by pivoted links 122 to the ribs 117. Sliding supports 123 (FIGURES 23 and 24) are arranged to be moved horizontally out from the frame structure 65 beneath the flaps to give additional support to these. Each sliding support 123 is a plate, deposited in a vertical plane, that carries rollers 140 that run on rails 141 on the frame structure 65, and each sliding support 123 is itself formed with rails 142a, 142b that run on rollers 143 pivoted on axes fixed in the frame structure 65. The upper rail 142a is constituted by the top edge of a longitudinal opening 144 in the sliding support while the lower rail 142b is constituted by an edge of the support. Each sliding support is moved between the flaps-supporting position of FIGURE 24 and the inoperative position of FIGURE 23 by rack and pinion mechanism 145, 146, the pinion 146 being driven by an electric motor 147 acting through reduction gearing.

The hydraulic pressure necessary to expand the telescopic beams 66, 119 and to extend the struts 69 is derived from a reversible compressor 130, driven by the engines 73, which drives oil from a tank 131, that in practice would be somewhat larger than appears in FIGURE 18, into the beams 66, 119, through pipes 132. The oil can pass from the outer ends of the telescopic beams through pipes 133 and valves 134 to the telescopic struts 69. Means (not shown) are provided for operating the valves 134 simultaneously.

The means to be adopted in causing the bridge unit to extend, after it has been driven to the location at which it is to be used as an overhead car park, will now be described. The unit is positioned at the centre of the road and the valves 134 are opened. Pressure is then applied by the compressor 130 through the beams 66 to the struts 69 so as to extend the struts without extending the beams. The struts 69 are only extended sufficiently to lift the wheels 68 from the road, the valves 134 then being closed to hold the struts in their extended condition. Motors 135 (FIGURE 20) in the legs 72 are then started to cause the arms 64 to turn about the axes of the shafts 82 towards the centre of the unit, until they are at right angles to the positions shown in the drawings. For this purpose the arms 64 are mounted to swivel on the legs 72 with intervening roller thrust bearings 136. The bearing mechanism is only shown diagrammatically and in practice is designed to lift the arms 64 effectively when the struts 69 are extended. In addition, the tubes 92 are provided with means (not shown) for retaining these in the arms 64. Each motor 135 turns its respective arm 64 through the medium of irreversible worm gearing in a casing 137 and of spur gearing 138. As each arm swings round towards the centre of the unit, the bevel gearing 96 will cause the tube 95 to rotate about its axis, causing the associated pair of wheels 68 to revolve about the vertical axis of the tubes 90, 92. When the arm 64 has reached the required position, at right angles to the fore-and-aft direction of the central frame structure, the axis of the wheels 68 should be parallel to this direction, that is to say at right angles to the arm 64. The final adjustment to bring the wheels to this position may be effected by manipulating the steering connections. Alternatively means may be provided for separating the bevel gears 96 while the arm 64 is being swivelled about its vertical axis, and for thereupon putting the bevel gears 96 into mesh with one another. After the wheels have been positioned in this fashion, the valves 134 are opened and the compressor 130 driven in the reverse direction to withdraw liquid from the struts 69 causing them to close by suction and gravity. The unit then rests on its wheels in their new positions. The valves 134 are closed and pressure applied to the telescopic beams 66, 119 to extend them. The wheels 68 are thereby caused to roll towards the side walks or pavements until the struts 69 and legs 72 are located above the edges of the side walks. This action of the fluid operated beams 66, 119 may be replaced by or supplemented by driving the wheels 68 themselves by means of the engines 73 and of the mechanical connections, already described, between the engines and the wheels. For this purpose it is necessary to provide means for bridging the clutch elements 80 in the shafts 78 when the unit is expanded. Alternatively the shafts 78 may be constructed as telescopic splined shafts. Finally the valves 134 are opened once more to extend the struts 69 to their full extent and the wheel arms 64 are swung round to their original positions relatively to the legs 72, so as to avoid the wheels 68 obstructing traffic passing beneath the bridge.

Figure 14:
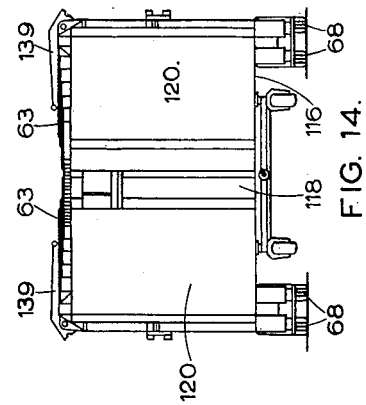
Figure 15:
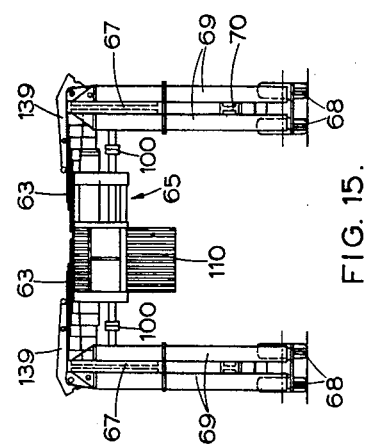
FIGURE 15 is a view similar to FIGURE 14 but as viewed after certain parts have been removed.

The wheels may be provided with brakes operated by flexible sheathed push-pull cables. Railing frames 139 are distributed along the joists 67 and are hinged thereto so as to be folded down as shown in FIGURES 14 and 15 when the unit is folded and being driven from one place to another.

In a modification of the construction shown in FIGURES 13 to 29, the telescopic beams are mounted in reversed positions. That is to say the widest ends are attached to the joists 67 and their ends of least diameter are attached to the frame structure 65. In another modification the central frame structure 65 is eliminated and a similar frame structure is used in place of one of the joists 67. Thus, the engines or engine, the compressor and the driver's quarters are located on one side of the unit and there is only one set of telescopic beams 66 interposed between the frame structure on one side and the joist, such as 67, on the other side.

Figure 13:
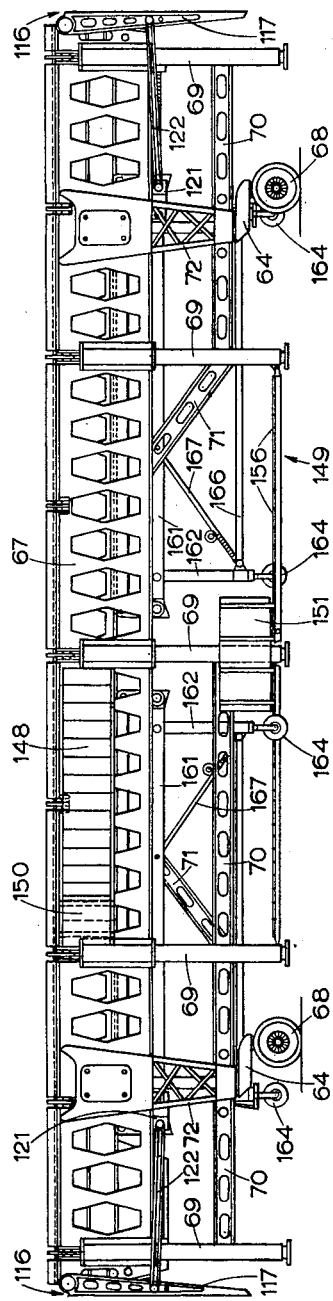
FIGURE 13 is a side elevation of a third transportable bridge unit, the unit being shown in its folded condition.
Figure 22:
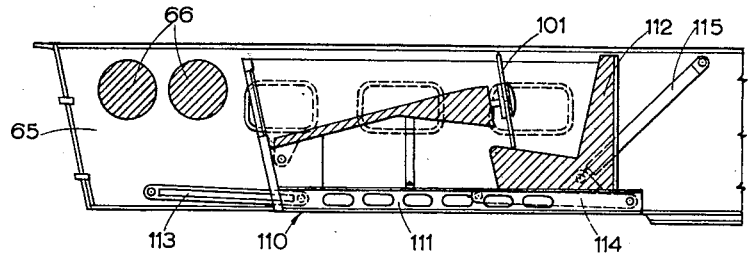
FIGURE 22 is a view similar to a portion of FIGURE 21 but showing the parts in different relative positions.
Figure 20:
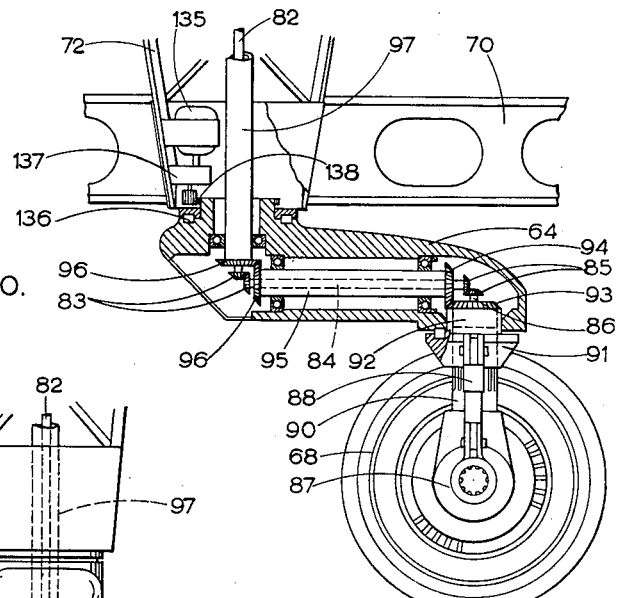
FIGURE 20 is a sectional side elevation of the part of the unit appearing in FIGURE 19.
Figure 19:
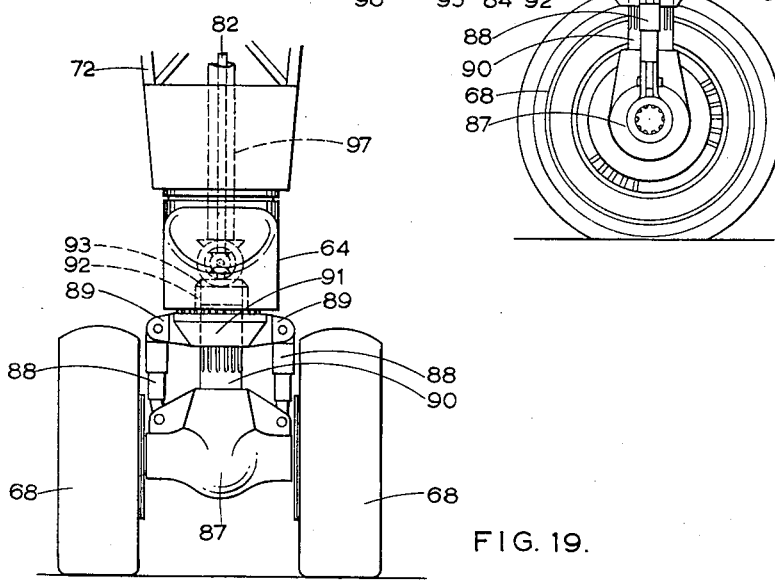
FIGURE 19 is a front elevation, on an enlarged scale, of part of the unit of FIGURES 13 to 18.
Figure 21:
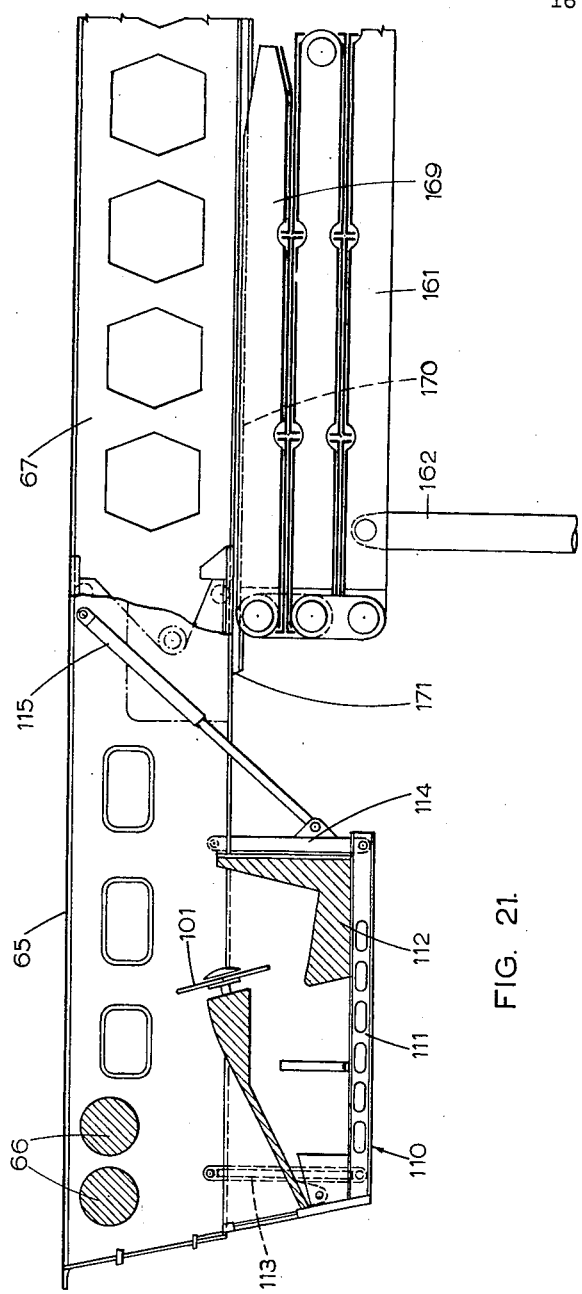
FIGURE 21 is a sectional side elevation, on an enlarged scale of another part of the unit of FIGURES 13 to 18.
Figure 25:
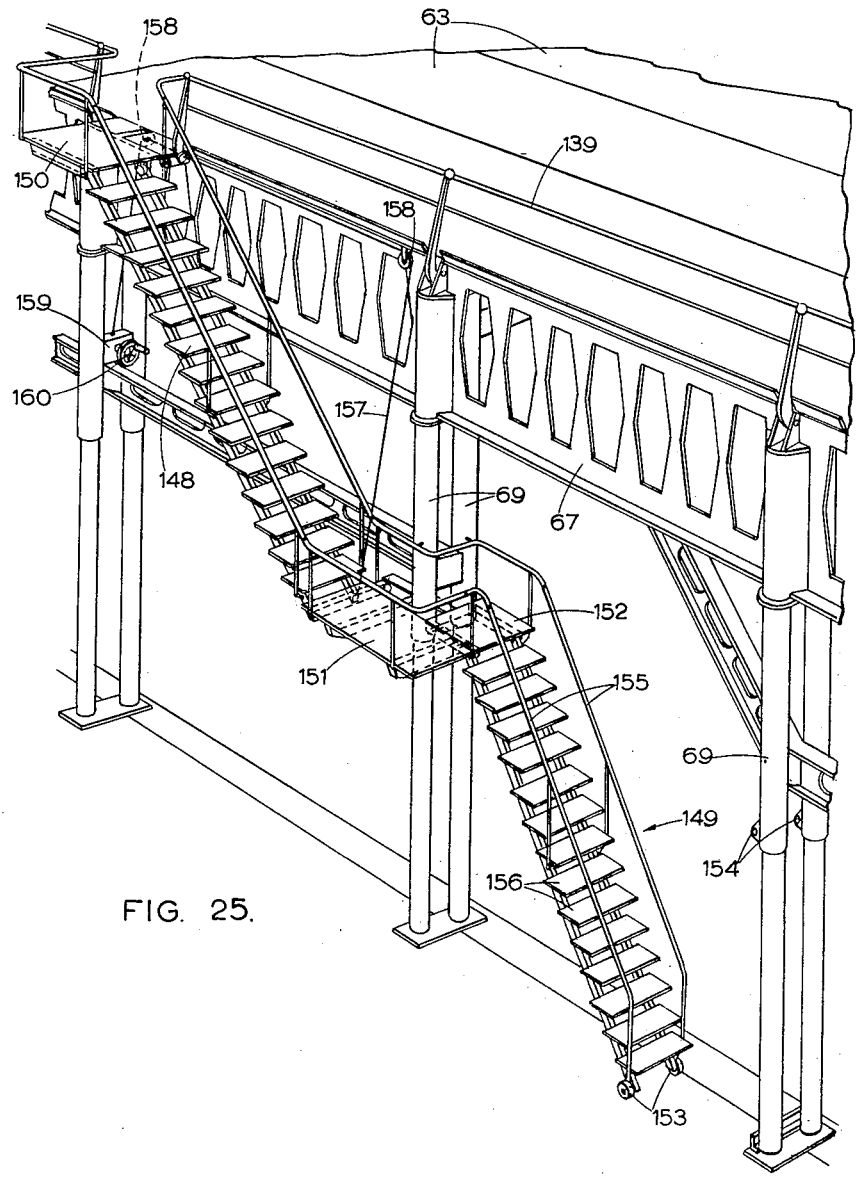
FIGURE 25 is a perspective view showing certain details applicable to the unit of FIGURES 13 to 18.

FIGURE 25 shows an accessory in the form of a stairway comprising two flights 148, 149 of stairs. The top flight 148 extends down from a landing 150 at one side of the decking constituted by the plates 63 to a landing 151, pivotally attached to and co-planar with a landing 152, when the stairway is in the operative condition of FIGURE 25. The bottom flight 149 extends down to the ground from the landing 152, which is fixed to the top sections of a pair of the telescopic struts 69, rollers 153 that rest on the ground being mounted at the lower end of the flight 149. The latter is pivoted to the landing 152 so that, when the struts 69 are caused to contract, the rollers 153 run along the ground as the flight 149 swings upwards relatively to the landing 152. When the struts 69 have collapsed completely, the free end of the flight 149 is in position to be made fast to lugs 154 on the fixed top sections of the adjacent struts 69. The flight 149 is furnished with railings 155 that are separate from but constitute extensions of railings on the landings 151, 152. If desired, the steps 156 in the flight 149 may form parts of a parallelogram linkage that enables these steps to fold into alignment with one another as shown in FIGURE 13. The upper flight, which is pivoted at its upper end to the landing 150, may be raised to a substantially horizontal position by a cable 157 passing over pulleys 158 to a drum, located in a container 159 and turned by a handle 160, means being provided for locking the drum against reverse movement until it is desired to lower the flight 148. The landing 150 is so pivoted to the adjacent joist 67 as to be capable of undergoing a limited turning movement between the horizontal position of FIGURE 25 and the position of FIGURE 13, in which the landing 150 and flight 148 are in a vertical plane. It will be seen that the landing 151 is arranged to fold upwards in a similar manner. The railings associated with the flight 148 and the landings 150, 151 and 152 are arranged to be dismantled or folded to enable these folding movements to take place. If the spaces between the adjacent pairs of telescopic struts 69 is insufficient to accommodate the lengths of the flights 148, 149, the hinged upper ends of the latter may be arranged to slide to the left (as viewed in FIGURE 25) along the undersides of the landings 150, 152.

Figure 27:
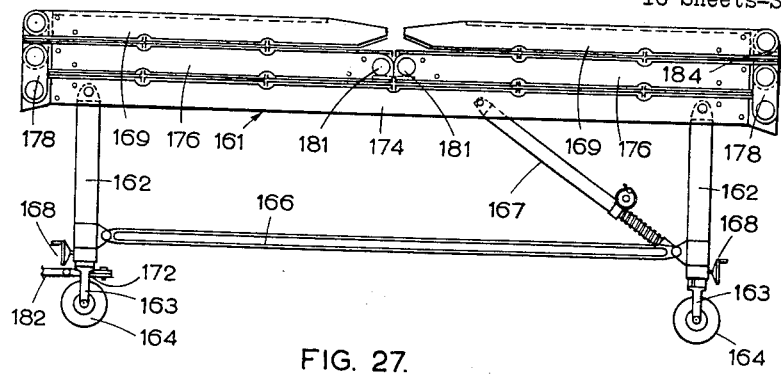
FIGURE 27 is a side elevation, on an enlarged scale of the ramp structure of FIGURE 26, shown in a folded condition.
Figure 28:
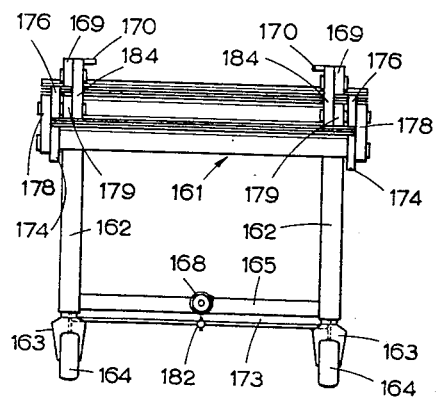
FIGURE 28 is an end elevation of the ramp structure of FIGURE 27.
Figure 29:
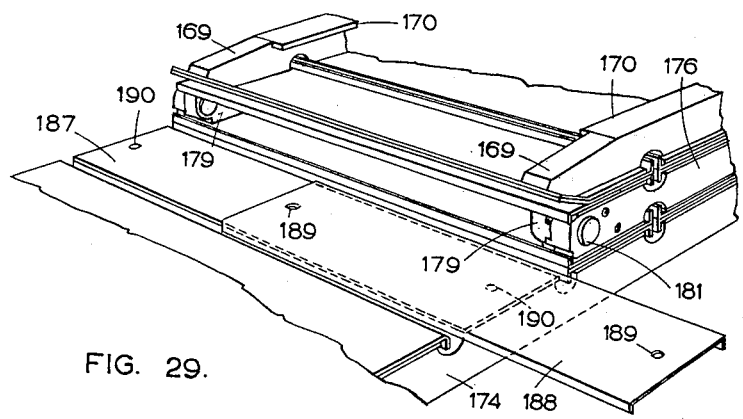
FIGURE 29 is a perspective view of part of the ramp structure of FIGURES 26 to 28.

The unit of FIGURE 13 is arranged to carry two ramps in a folded condition and arranged in tandem fashion beneath the central frame structure 65, in a manner already suggested above. Each such ramp structure is as shown in FIGURES 27 and 28 and includes a horizontal frame 161 having four extensible legs 162 respectively pivoted near the corners thereof, the lower ends of the legs being provided with forked supports 163 for wheels 164. The upper or outer sections of the legs in each transverse pair thereof are rigidly connected together by a tube 165 and the outer sections of each longitudinal pair are pivotally connected together by a link 166. A screw jack 167 is pivotally connected obliquely between the frame 161 and one of the legs 162. Each transverse pair of legs can be extended by turning a handle 168 on the associated transverse tube 165. For this purpose a co-axial shaft may be mounted in the tube 165 to be turned by a crown wheel meshing with a pinion co-axial with the handle 168. The ends of the shaft may be arranged, through bevel gearing, to rotate nuts axially fixed in the outer sections of the two associated legs 162. The inner sections of the legs are restrained against rotation about their axes and are in threaded engagement with the nuts.

Pivotally connected to each end of the frame 161, in the manner described below, is a series of ramp sections folded over one another. The outer or top one of each of these sections includes a pair of lateral beams 169 which, in the folded condition of FIGURES 27 and 28, present inturned flanges 170 which slide into channels 17 (FIGURE 21) on the frame structure 65 so as to provide support for the ramp structure for transport, it being understood that means (not shown) are provided for preventing the ramp sections from unfolding under gravity when in this packed condition.

When the bridge unit arrives at the position at which it is to serve as a car park, the legs 162 are extended by turning the handles 168 until the wheels 164 touch the ground. The ramp structure can then be wheeled along the ground until the flanges 170 are clear of the channels 171. It can then be towed clear of the bridge structure to the position in which it is most convenient to unfold and mount the ramp. For this purpose the two wheels at one end are mounted to swivel about vertical axes and are provided with arms 172 connected by a link 173 enabling the structure to be steered. A draw bar 182 extends from the centre of the link 173.

Figure 26:
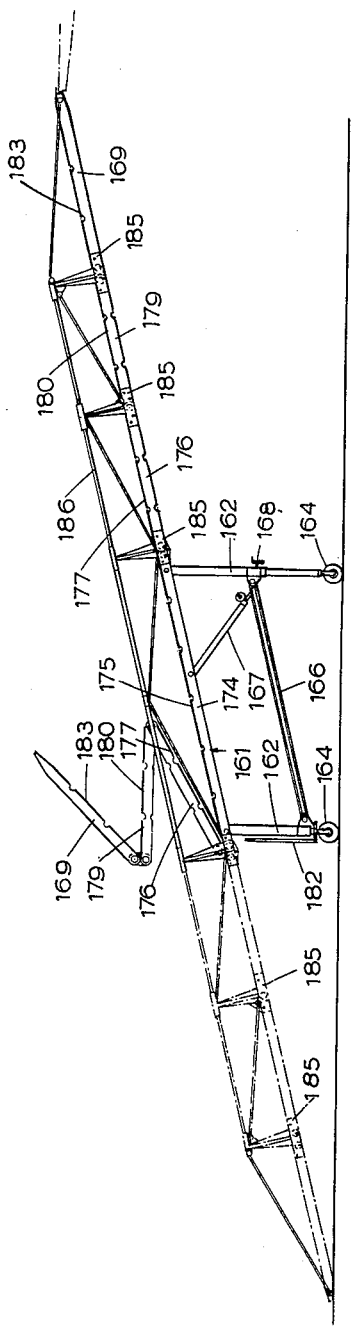
FIGURE 26 is a side elevation of a ramp structure constituting an accessory of the unit of FIGURES 13 to 18.

The frame 161 comprises side members 174 supporting top decking 175, and the sections connected directly to the ends of this frame comprise side beams 176 connected by decking 177, which is co-planar with the decking 175 when the ramp is fully unfolded as indicated in FIGURE 26. The side beams 176 are connected to the side members 174 by short links 178. The extent to which the ramp sections 176, 177 can be unfolded is determined by abutting stops respectively on these sections and on the central frame 161, that bring the sections 176, 177 to rest when in alignment with the frame 161. To the outer ends of the ramp sections 176, 177 are pivoted sections comprising side beams 179 joined by top decking 180. In the folded condition, these beams 179 lie between the beams 176 and are pivoted directly thereto by journal members 181. Again stops are provided that limit the extent to which the sections 179, 180 can be unfolded relatively to the sections 176, 177. The outermost ramp sections comprise the side beams 169 joined by decking 183. In the folded condition, the beams 169 respectively lie above the beams 179 and are pivotally connected thereto by short links 184. When the ramp has been unfolded, the joints are made rigid by securing gusset plates 185 between the members 174, 176, 179 and 169. Railing structures 186, parts of which may be folded together when the gusset plates 185 are dismounted, are attached to the gusset plates and to the outer extremities of the ramp sections 169, 183, not only to serve as railings but also to increase the strength of the ramp. The inclination of the ramp is adjusted by means of the screw jack 167 and the handles 168. The upper edge of the ramp is shaped so as very slightly to overlap the top of the bridge unit. The wheels 164 may be furnished with brakes to lock the ramp in position.

Where a wide ramp is required, it is convenient to mount the two ramp structures side-by-side, the railing structures 186 then being provided only at the outer edges of the pair of ramps. The decking 175, 177, 180, 183 consists of shallow, transverse, inverted channel members, but on one of the ramp structures, each channel member comprises two parts 187, 188 (FIGURE 29) fitting one within the other. Thus, when the two ramp structures are mounted side-by-side, each of the outer decking members 188 can be caused to slide laterally over the inner member 187 so as to overlap the corresponding decking member on the other ramp. The decking members 188 may be locked either in their retracted or overlapping positions by screws inserted through holes 189 and screwed into holes 190 in the decking members 187.

In a modified arrangement, such a twin ramp is applied to each end of the bridge structure which may then be used as a bridge to carry vehicles over road repairers at work. In such an arrangement it is unnecessary to extend the telescopic bridge struts 69.

I claim:
1. A transportable bridge unit comprising, in combination, and extensible framework, means for supporting said framework in an elevated position and adapted to enable it to be moved from one place to another, said framework including a central longitudinal frame structure and extensible means mounted on said structure for movement outwardly to increase substantially the horizontal superficial area of said framework on both sides and for retracting comparatively closely to said structure during transportation, and extensible struts mounted on said extensible framework on each side thereof, said struts upon being extended increasing the elevation of said framework and supporting it in its extended condition, and said means adapted to enable said framework to be moved from one place to another being mounted on said framework and movable thereon to positions providing an unimpeded path beneath said framework and between said struts when said framework and said struts are extended, said extensible means comprising a series of telescopic beams fixedly mounted in horizontal positions on both sides of said central frame structure extending transversely thereof and extensible therefrom, joists substantially parallel to said central frame structure carried by the outer ends of said beams, and an extensible cover sheeting overlying said extensible means and said central frame structure and extending between said central frame structure and said joists and connected to said joists for extension, when said joists are separated, to provide a covering over said extensible means.

2. A transportable structural unit comprising in combination, a framework including a central longitudinal frame structure and extensible means carried by said structure for substantially increasing the area of said framework, said extensible means including girders mounted on said framework to swing outwards substantially horizontally on each side of said frame structure, joists substantially parallel to said frame structure and having a sliding and translational connection with the outer ends of said girders, whereby said girders, on being swung outwardly, cause said joists to separate from one another and from said frame structure, and extensible cover sheeting, interposed between said frame structure and said joists, connected to said joists for extension when said joists are separated to provide a covering over said extensible means, at least one rib interposed between said frame structure and one of said joists, at least one rib interposed between said frame structure and the other of said joists, and means providing sliding and rotational connections between the ends of said ribs and the adjacent girders, whereby as said girders are swung away from said frame structure, each rib separates from the adjacent joist and from said frame structure to provide an intermediate support for said cover sheeting.

3. The transportable, bridge unit of claim 1 comprising also a flap made in three parts hinged respectively to said longitudinal frame structure and to said extensible means on opposite sides of said frame structure, said parts being hinged to said extensible means so as to extend with the latter, and means for raising said flap after the extension of said framework and for holding said flap level with said extended framework.

4. A transportable single-span bridge unit comprising a framework adapted to be extended and retracted in a substantially horizontal plane, and including means for extending the framework in a transverse direction, the longitudinal dimension of said framework at right angles to said transverse direction being substantially larger than the transverse dimension of said framework, when retracted, the transportable unit comprising also undercarriage means lying substantially within the width of said retracted framework, means connecting said undercarriage means to said retracted framework for the transportation thereon of said retracted framework in the direction of said longitudinal dimension, for the extension of said framework in the transverse direction while supported by said undercarriage means and for the withdrawal of the undercarriage means from beneath the extended framework, two rows of extensible struts connected respectively to the longer edges of said framework, the struts in each said row being distributed along said framework substantially at the edge thereof, means for extending said struts to contact the ground so as to lift said framework and undercarriage means and to provide a firm and immobile support for said framework in the extended condition, said framework and said struts then providing a single-span bridge structure, a covering secured to said framework so as to extend therewith from a neatly packed condition and provide a deck on said framework, and means on said framework for returning said covering to the neatly packed condition when said framework is folded.

5. A transportable single-span bridge unit comprising, in combination, a framework adapted to be extended and retracted in a substantially horizontal plane and including a central longitudinal rigid frame structure, extensible means carried by said structure for substantially increasing the horizontal superficial area of said framework on both sides of said structure, and means for extending said extensible means, the longitudinal dimension of said framework being substantially larger than the transverse dimension of said framework, when retracted, the transportable unit comprising also undercarriage means lying substantially within the width of said retracted framework, means connecting said undercarriage means to said retracted framework, for the transportation of said retracted framework in the direction of said longitudinal dimension, and for the extension of said framework in the transverse direction while supported by said undercarriage means, two rows of extensible struts connected to the longer edges of said framework, the struts in each said row being distributed along the framework substantially at the edge thereof, means for extending said struts to contact the ground so as to lift said framework and undercarriage means and to provide a firm and immobile support for said framework when said framework is in the extended condition, said framework and said struts then providing a single-span bridge structure, and means for covering said extended framework to provide a deck thereon, said connecting means between said undercarriage and said retracted framework being mounted for the withdrawal of said undercarriage means from beneath the extended framework.

6. A transportable bridge unit according to claim 5, provided with prime mover means mounted in said central longitudinal rigid frame structure adapted to actuate said extensible means and said extensible struts.

7. A transportable single-span bridge unit comprising a framework adapted to be extended and retracted in a substantially horizontal plane and including means for extending the framework in a transverse direction, the transportable unit comprising also undercarriage means supporting said framework and including pivotal mountings and wheels carried by said pivotal mountings for the transportation of said framework in a direction at right angles to said transverse direction, said pivotal mountings being adapted to permit said wheels to travel in said transverse direction while still supporting said framework during the extension thereof, two rows of extensible means connected respectively to the edges of said framework parallel to said direction of transportation, the extensible means in each said row being distributed along said framework substantially at the edge thereof, means for extending said extensible means to contact the ground so as to provide a firm and immobile support for said framework in the extended condition and to raise said framework a substantial distance above a roadway to permit travel therebeneath, and expansible cover means for covering said extended framework to provide a deck thereon, said cover means when collapsed lying not substantially above the top of the framework.

8. A transportable bridge unit according to claim 7, comprising also prime mover means mounted in said framework, hydraulic motor means operatively connected with said framework extending means adapted to extend said framework and deriving its power from said prime mover means, mechanical connecting means between said prime mover means and said wheels, said mechanical connecting means comprising gear connected shafts adapted to drive at least two of said wheels both in said transverse direction and in said direction at right angles to said transverse direction, and steering means for said wheels comprising gear connected tubular shafts co-axial with said first-mentioned shafts, said pivotal mountings being cantilever members pivoted about vertical axes at their supported ends and having said wheels respectively mounted at their free ends.

9. A transportable bridge unit according to claim 8, comprising also two gondolas, containing respectively said two separate steering means, and means for raising said gondolas into and lowering said gondolas to operative positions somewhat below said framework, said gondolas being located at opposite ends of said framework.

10. A transportable bridge unit for use as an overhead car park above a street comprising, in combination, a framework adapted to be extended and retracted in a substantially horizontal plane, including a strong, rigid central longitudinal frame structure, means on each side of said frame structure for extending said frame structure transversely to its length, power means in said frame structure for actuating said last mentioned means for extending and retracting folding the framework, and expansible cover means for covering said extended framework to provide a deck thereon, undercarriage means supporting said extensible framework and consisting of vertical legs mounted substantially at the lateral longitudinal edges of said framework, both in the extended and retracted condition of said framework, pivotal mountings disposed respectively at the lower ends of said legs and wheels respectively carried by said pivotal mountings for transporting said framework in the direction of said longitudinal frame, said pivotal mountings being adapted to permit said wheels to travel in a direction transversely to said longitudinal frame structure while still supporting the framework during the extension thereof, two rows of extensible means fixed respectively to the lateral longitudinal edges of said framework, both in the extended and retracted condition of said framework, power means in said longitudinal frame structure for extending said extensible means, and means interconnecting said last mentioned power means and said extensible means for extending said extensible means to contact the ground so as to provide a rim and immobile support for said framework in the extended condition with said framework spanning traffic in a street beneath.

11. A transportable bridge unit according to claim 10, in which the wheels on one of said legs are adapted to be driven and in which wheels on a second of said legs, transversely opposite said first-mentioned leg, are adapted to be driven, said unit further comprising a prime mover for driving said wheels mounted in said frame structure, substantially vertical driving shafts in said first and second legs for driving the associated wheels, and substantially horizontal driving shafts operatively connected to said vertical shafts and said prime mover for driving transmission between said prime mover and said vertical shafts, when said framework is retracted, each said horizontal shaft being equipped with a clutch which is disengaged when said framework is extended.

12. A transportable bridge unit according to claim 10, in which there are four of said legs, two of said legs being mounted side-by-side towards one end of the unit and two side-by-side towards the other end of the unit, means for steering the wheels carried by said first-mentioned two legs, separate means for steering the wheels carried by second mentioned legs, and means in said frame structure to operate said two separate steering means from opposite ends of the unit, each said steering means including shafts in said framework extending from said frame structure to the associated legs when said framework is retracted, and each said shaft including a clutch having parts that disengage when said framework is extended.

References Cited in the file of this patent
UNITED STATES PATENTS

| | | |
|---|---|---|
| 430,935 | Edwards | June 24, 1890 |
| 1,125,184 | Schleicher | Jan. 19, 1915 |
| 1,136,604 | L'heureux | Apr. 20, 1915 |
| 1,497,703 | Stillman | June 17, 1924 |
| 1,674,279 | Ebeling | June 19, 1928 |
| 1,738,212 | Smith | Dec. 3, 1929 |
| 2,062,473 | Norton | Dec. 1, 1936 |
| 2,169,406 | Cost et al. | Aug. 15, 1939 |
| 2,367,291 | LeTourneau | Jan. 16, 1945 |
| 2,600,199 | Brewster | June 10, 1952 |
| 2,668,331 | Horn | Feb. 9, 1954 |
| 2,671,697 | North | Mar. 9, 1954 |
| 2,700,169 | Henion | Jan. 25, 1955 |
| 2,704,223 | Houdart | Mar. 15, 1955 |
| 2,726,743 | Short | Dec. 13, 1955 |
| 2,749,137 | Thomsen et al. | June 5, 1956 |
| 2,779,425 | Miller | Jan. 29, 1957 |

FOREIGN PATENTS

| | | |
|---|---|---|
| 785,137 | France | May 13, 1935 |
| 702,071 | Great Britain | Jan. 6, 1954 |